United States Patent [19]

Mullersman

[11] 4,009,429
[45] Feb. 22, 1977

[54] CHARGER WITH MULTIPLE ATTACHABLE CELLHOLDER MODULES

[75] Inventor: Ferdinand H. Mullersman, Gainesville, Fla.

[73] Assignee: General Electric Company, Columbus, Ohio

[22] Filed: Dec. 31, 1975

[21] Appl. No.: 645,843

[52] U.S. Cl. .................. 320/2; 320/6; 320/15
[51] Int. Cl.² ........................ H02J 7/00
[58] Field of Search ............... 320/2–7, 320/15, 13

[56] References Cited
UNITED STATES PATENTS

| | | | |
|---|---|---|---|
| 2,649,493 | 8/1953 | Temple | 320/7 UX |
| 3,256,474 | 6/1966 | Englund, Jr. | 320/7 |
| 3,435,318 | 3/1969 | Mas | 320/15 |
| 3,665,285 | 5/1972 | Mullersman et al. | 320/2 |
| 3,696,283 | 10/1972 | Ackley | 320/2 |

Primary Examiner—Robert J. Hickey
Attorney, Agent, or Firm—D. A. Dearing; D. J. Voss; F. L. Neuhauser

[57] ABSTRACT

A charging system for alternatively charging cells having different physical sizes and/or electrical characteristics comprising a charge current source, a plurality of cellholder modules and interconnection means on said charger and said modules for selective alternative connection of each of said modules to the charger. Each module has an electrical circuit including a discharge prevention means for preventing inadvertent discharge of cells disposed in the module.

12 Claims, 9 Drawing Figures

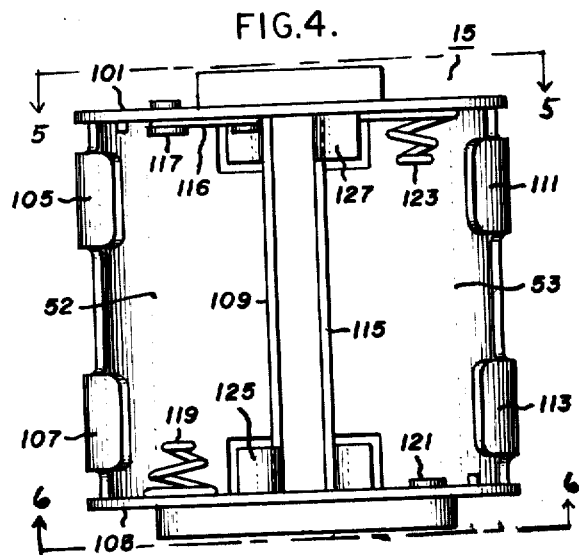
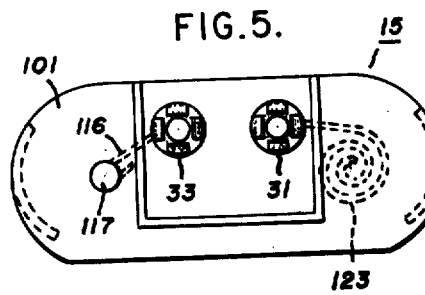
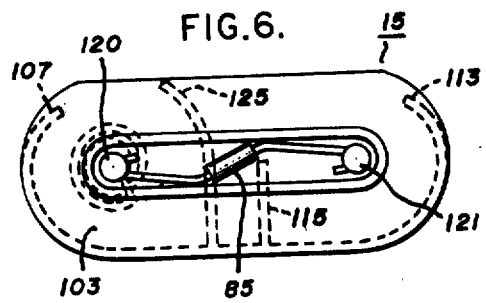
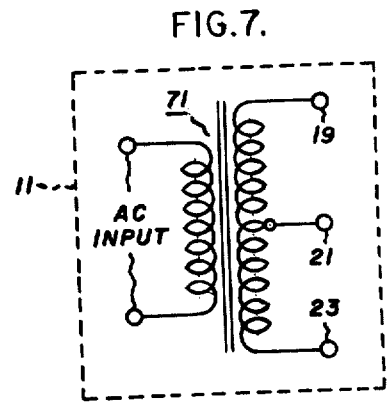
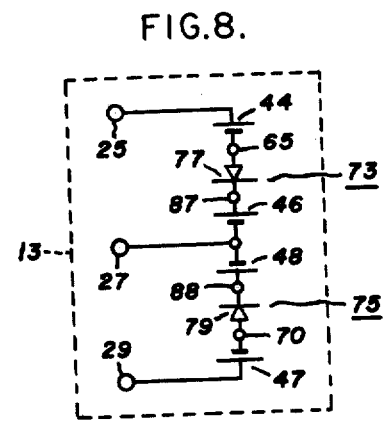
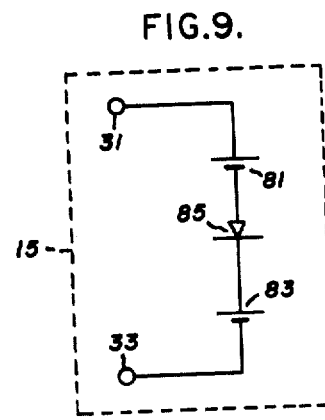

CHARGER WITH MULTIPLE ATTACHABLE CELLHOLDER MODULES

BACKGROUND OF THE INVENTION

This invention relates to rechargeable batteries and more particularly to a simple, inexpensive charging system whereby rechargeable cells of different physical size and/or electrical characteristics are selectively and alternatively connectible to a charge current source for recharging.

There is an increasing number of consumer products being operated by rechargeable cells such as nickel-cadmium cells. These products require cells with a plurality of physical sizes and electrical characteristics.

Cells are generally denominated on the basis of the external dimensions. According to such size designations, three well known sizes are the AA, C and D sizes, respectively.

In the case of certain lines of nickel-cadmium cells as manufactured by the General Electric Company, the assignee of the invention herein, the electrical characteristics of the C and D size cells are the same, while the electrical characteristics of the AA size cells are different from that of the C and D sizes; namely:

| Size | Voltage | Capacity | Recommended Charge Current (Charge Rate C/10) |
| --- | --- | --- | --- |
| AA | 1.2V | .5 Ah. | 50 mA. |
| C | 1.2V | 1 Ah. | 100 mA. |
| D | 1.2V | 1 Ah. | 100 mA. |

The variety of cell types in wide use in the consumer market has given rise to the need to provide a unitary charging device to accomodate the various cell types. One such device is described in U.S. Pat. No. 3,579,075 issued on May 18, 1971 and assigned to the assignee of the invention herein. While this device provides a viable approach for charging cells of a variety of types, it has failed to achieve wide spread adoption in the consumer market because of its complexity and cost of construction.

Accordingly, it is an object of this invention to provide an improved system for accomodating a plurality of cell types.

Another object of this invention is to provide a charging system for a plurality of cell types which is safe, relatively inexpensive and simple to operate.

SUMMARY OF THE INVENTION

These and other objects of the invention, which will be apparent from a consideration of the detailed description hereinbelow and accompanying claims, are accomplished by a charging system comprising a charge current source, a plurality of cellholder modules, each corresponding to one cell type, and interconnection means on said charger and said modules for selective, alternative connection of each said module to said charger. Another feature of the invention is provided by a cellholder module having an electrical circuit including a discharge prevention means for preventing the inadvertent discharge of cells disposed in said module.

BRIEF DESCRIPTION OF THE DRAWINGS

FIG. 4 is an elevational view of one side of a "C" cellholder module in accordance with the features of this invention.

FIG. 5 is a plan view of top end of the module of FIG. 4 taken along line 5—5.

FIG. 6 is a plan view of the lower end of the module of FIG. 4 taken along Line 6—6.

FIG. 7 is a circuit diagram of the charge current source of FIG. 1.

FIG. 8 is a circuit diagram of the module of FIG. 1.

FIG. 9 is a circuit diagram of the module of FIG. 4.

DESCRIPTION OF THE PREFERRED EMBODIMENTS

Figure 1:
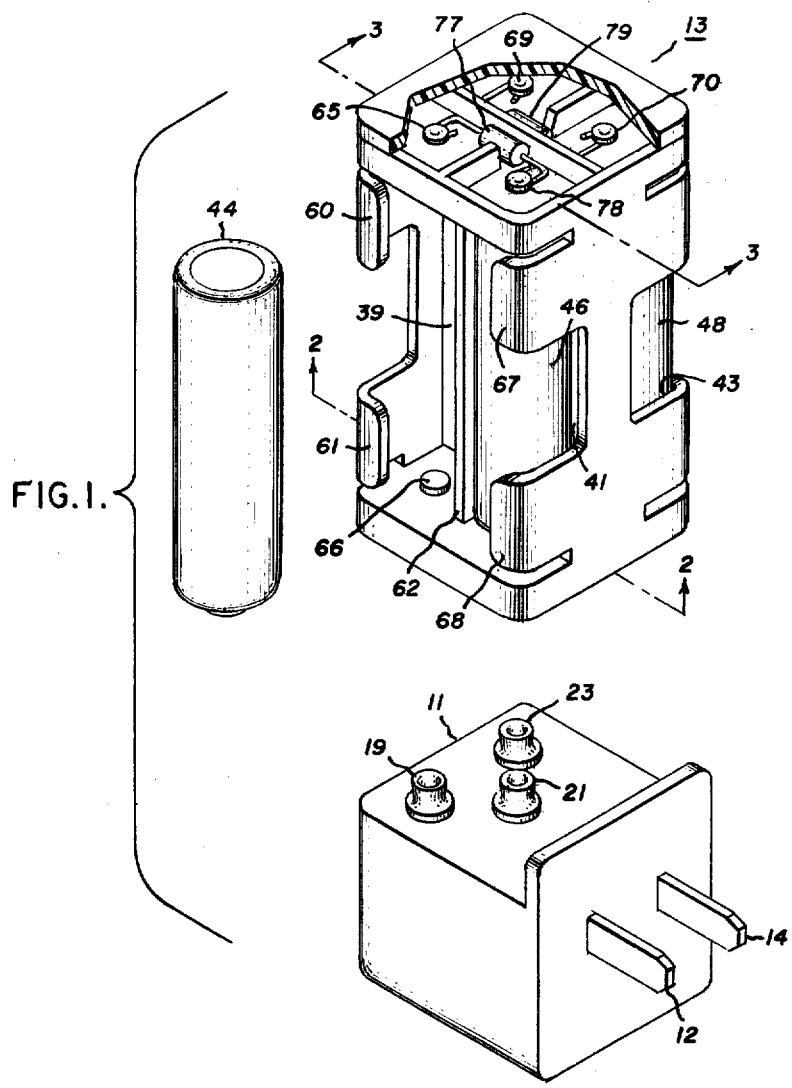
FIG. 1 is an exploded, perspective view of a charge current source and an "AA" cellholder module in accordance with the features of this invention.

In FIGS. 1 and 4, a charging system for charging a plurality of cell types in accordance with a preferred embodiment of this invention is illustrated. The system is generally comprised of a charge current source 11 and a plurality of cellholder modules 13, 15. FIG. 1 is an exploded perspective view of the relationship assumed by source 11 and module 13 when connected for charging. FIG. 4 is an elevational view of module 15 which is connectible to source 11 for charging cells of another size.

For purposes of illustration only, cellholder modules are shown for two of the three common cell types, AA, C and D to which this invention in its preferred embodiment has direct application. The modules for "C" and "D" cells are mechanically and electrically identical in construction except that the module for "C" size cells is physically dimensioned to accept the smaller "C" size cells and the module for "D" size cells is physically dimensioned to accept the larger "D" size cells. Accordingly, only the module for "C" size cell will be described as exemplary of both. However, as will be clear to those skilled in the art, the invention is not limited to any particular number of cellholder modules, nor is it limited to a system for charging any particular cell type.

The charge current source 11 is comprised of a conventional high impedance center tapped transformer shown schematically in FIG. 7. Two blades 12, 14 are provided on one face of the charger housing for connection to a source of 120V AC.

The modules 13, 15 are adapted to be selectively and alternatively connectible to the source 11 via interconnection means provided on source 11 as terminals 19, 21, 23 and on module 13, 15 as terminals 25, 27, 29 (FIG. 2); and terminals 31, 33 (FIG. 5) respectively.

Figure 2:
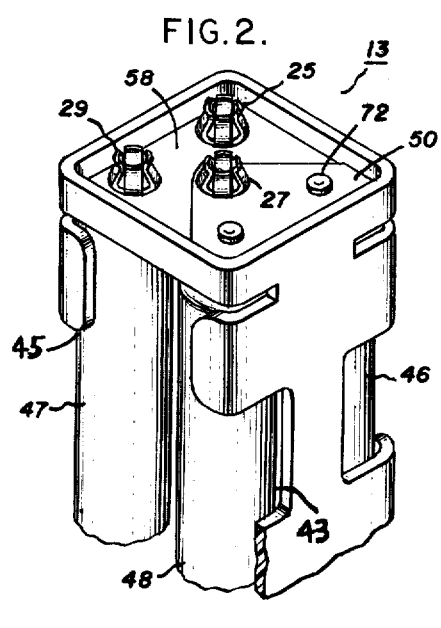
FIG. 2 is a fragmentary, perspective view of the lower end of the module of FIG. 1 taken along Line 2—2.
Figure 3:
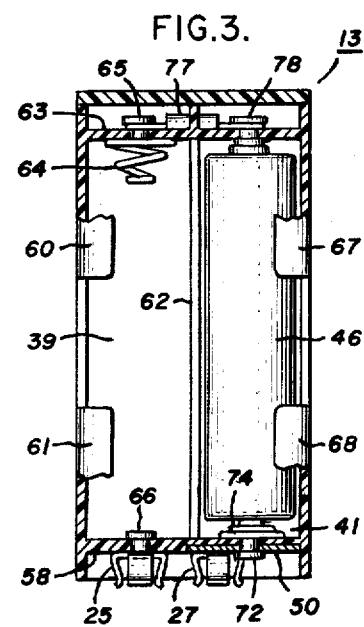
FIG. 3 is a fragmentary cross-sectional view of the module of FIG. 1 taken along line 3—3.

The modules are preferably of a molded plastic construction and each comprises a plurality of compartments for mounting cells of a particular type. As shown in FIGS. 1, 2 and 3, module 13 has four compartments, 39, 41, 43, 45 for accomodating four AA cells. Compartment 13 is shown with an "AA" cell 44 displaced outwardly of compartment 39.

Compartments 41, 43, 45 are shown with AA size cells 46, 48, 47 respectively disposed therein in charging position. Module 15 (FIG. 4) accommodates two "C" cells in a pair of compartments 52, 53.

Each of the compartments 39, 41, 43, 45 of module 13 are similarly constructed. For example, compartment 39 is defined as a pair of resilient side wall tabs 60, 61, partition wall 62 and a pair of end walls 58, 63. At one end of compartment 39, a conductive coil spring 64 for providing a tight resilient fit for a cell disposed therein is mounted on end wall 63 by an eyelet 65. Spring 64 also provides electrical contact to the negative terminal of a cell in compartment 39. At the opposite end of compartment 39, a contact eyelet 66 is mounted in and extends through end wall 63 to provide electrical connection between the positive terminal of a cell disposed in compartment 39 and terminal 25.

Compartment 41 is similarly defined by a pair of resilient tabs 67, 68, end walls 58, 63 and partition wall 62. Electrical contact to the negative terminal of cell 46 is made via a coil spring 74 fixed to wall 58 via a mounting eyelet 72. Eyelet 72, which is mounted through end wall 58 and a metallic connector plate 50 on which terminal 27 is mounted, provides electrical connection between the spring 74 and terminal 27. Electrical contact to the positive terminal of cell 46 is made via a contact eyelet 78. Electrical connection between the eyelets 65 and 78 is provided through a diode 77 for reasons as will be explained fully hereinbelow in connection with FIG. 8.

The remaining two compartments 43, 45 of module 13 (FIG. 2) have a construction identical to the compartments 39, 41 previously described. Electrical connections between terminal 29 and the positive terminal of cell 47 in compartment 41, between the negative terminal of cell 47 and the positive terminal of cell 48 in compartment 43 via a diode 79, between the negative terminal of a cell 48 to terminal 27 via connector plate 50 are all made in an analogous manner to that previously described for compartments 39, 41.

Referring now to FIGS. 4, 5 and 6, compartment 52 is defined by end walls 101, 103, side wall tabs 105, 107 and partition wall 109. Compartment 53 is defined by end walls 101, 103, side wall tabs 111, 113 and partition wall 115.

Terminals 31, 33 (FIG. 5) are mounted to end wall 101 by any conventional means. The terminal 33 is connected to the positive terminal of a cell mounted in compartment 52 via a connector wire 116 and a contact eyelet 117. A coil spring 119 is mounted on the interior of end wall 103 for providing a tight resilient mounting for cell in compartment 52, and for forming an electrically conductive path with the negative terminal thereof.

Electrical connection between the negative terminal of a cell in compartment 51 and the positive terminal of a cell in compartment 53 is provided via the coil spring 119, a contact eyelet 120, a diode 85, and a contact eyelet 121. Eyelet 121 forms a conductive path with the positive terminal of a cell in compartment 53.

The negative terminal of a cell in compartment 53 is electrically connected to terminal 31 via a coil spring 123 mounted on the interior of end wall 101.

Another feature of the invention in accordance with a preferred embodiment thereof is provided by loading tabs 125, 127. The loading tabs reduce the opening of compartments 51, 53 to a size such that when loading and unloading a cell, for example in compartment 53, the cell must be loaded by inserting the negative terminal portion of the cell in the region between side wall tabs 111, 113, sliding the cell substantially axially to contact and depress the spring 123, and then pushing the positive terminal of the cell inwardly of compartment 53 and into contact with contact eyelet 121.

This loading procedure required by loading tabs 125, 127 is particularly advantageous for use with nickel-cadmium "C" and "D" size cells constructed in accordance with the invention as described in U.S. Pat. No. 3,684,583 which is assigned to the assignee of the invention herein. Such cells are preferably constructed with an outer plastic tubular housing having one end closed by a metal disk. The metal disk functions as the negative terminal of the cell. It has been found that without the use of loading tabs that the coil spring has a tendency to catch on the rolled edge of the tubular housing. This tends to make loading and unloading of the cell difficult or may eventually damage the cell housing.

FIGS. 7, 8 and 9 show a diagram of a preferred embodiment of an electrical charging circuit for the charging system. FIG. 7 shows the circuit diagram of the charge current source 11. FIG. 8 shows the circuit diagram of module 13 for charging either two or four "AA" cells. FIG. 9 shows the circuit diagram for cellholder module 15 for charging two "C" cells. As explained above, a circuit diagram for "D" cellholder module is not shown because it is electrically identical to that of module 15 as shown in FIG. 8.

As shown in FIG. 7, the source 11 comprises a transformer 71 to make available from the standard 110 – 120 volt cycle AC line an output current of the appropriate magnitude for the load provided by modules 13, 15 respectively. The terminal 21 is centrally tapped to the secondary of transformer 71 to provide equal and opposite AC input voltages for module 13.

As shown in FIG. 8 the circuit for module 13 comprises two sections 73, 75 for accommodating either two or four AA cells for charging. If only two cells are to be charged at one time, both of the cells must be disposed in the same circuit section so as to form a complete charge current path. Section 73 connects a pair of AA cells 44, 46 disposed in compartments 39, 41 in a series relationship for charging via a charge current path formed by connection of module terminals 25, 27 to charger terminals 19, 21 respectively. Similarly, Section 75 connects a pair of AA cells 47, 48 disposed in compartments 43, 45 in a series relationship for charging via a charge current path formed by connection of module terminals 27, 29 to charger terminals 21, 23, respectively.

Another feature of this invention is provided by a pair of discharge current prevention means 77, 79 which are connected in sections 73, 75 respectively to prevent the inadvertent shorting of the branches 73, 75 when disconnected from source 11. In the illustrated embodiment the prevention means 77, 79 are provided in the form of diodes which are connected between each pair of cells 44, 46, at contacts 65, 87 and cells 47, 48 at contacts 88, 70. When cells are loaded in module 13, the cells in section 73, 75 are unable to deliver excessive power to a load connected between terminals 25, 27 and 29. This permits the module to be safely carried by the user with cells loaded therein without fear of inadvertently short-circuiting the circuit branches 73, 75 at the terminals 25, 27, 29. The diodes 77, 79 also rectify the current supplied by source 11 when module 13 is connected thereto.

The opposed arrangement of the polarities of the cells 44, 46 with respect to cells 47, 48 is also an important feature of the invention. This arrangement would require a discharge current to flow in a counter clockwise direction in section 73 and in a clockwise direction in section 75. Thus, excessive power delivery to a load short circuited between contacts 87, 88 is prevented by the opposed polarity of cells 46, 48.

A further advantage of this arrangement is that cells 44, 46 are charged on the positive half cycle of the AC signal and cells 48, 47 are charged on the negative half cycle. Thus, the full AC wave is utilized for charging which results in efficient operation of the transformer.

In FIG. 9, the circuit is shown for connecting a pair of "C" cells 81, 83 disposed in compartments 51, 53 respectively in a series relationship for charging via a charge current path formed by connection of module terminals 31, 33 to the charge current source terminal 19, 23, respectively. No connection is made to the centertapped source terminal 21 and thus the total AC voltage developed by the transformer 71 is applied to the circuit of module 15. A discharge current prevention means 85 is connected in the circuit of module 15 intermediate cells 81 and 83. Similarly to prevention means 73, 75 of module 13, prevention means 85 provides the duel function of preventing inadvertent high rate discharge of the cells by shorting across terminals 31, 33 and rectification of the AC output from source 11 during charging.

While the preferred position of the diodes 77, 79 and 85 is, as shown in FIGS. 8 and 9, in series between adjacent series connected cells, it will be recognized that the diodes can be positioned electrically in series between the module terminal and one of the cells in the series connected pair. For example, in FIG. 9 the diode 85 can be positioned in series between terminal 31 and the positive terminal of cell 81.

Also, while it is preferred to position the diode in the module both to rectify the charge current and to prevent high rate discharge of cells in the module, it will be recognized that the rectification of charge current could be performed by the incorporation of rectification means in the circuit of transformer 71 in charge current source 11 and that the high rate discharge prevention function could be provided by a fuse or resistor in the respective sections of the module circuits.

Another feature of this invention permits the charging of cells having different electrical characteristics with the same charge current source. As noted hereinabove, recommended charge current for certain AA cells is 50 mA while the preferred charge current for certain C and D cells is 100 mA. The charge current source 11 (FIG. 7) is designed to deliver a charge current of approximately 100 mA to a pair of "C" cells 81, 83 when module 15 (FIG. 9) is connected across the total EMF of secondary of source 11. Source 11 thus delivers a charge current of approximately 50 mA to each pair of "AA" cells 44, 46 and 47, 48 when module 13 (FIG. 8) is connected to source 11. This result is achieved because each pair of AA cells is connected across one-half of the EMF of the secondary of source 11.

Thus, in accordance with this invention a simple, low cost charging system is provided for charging commonly available consumer cells such as AA, C and D. While the invention has been described in accordance with preferred embodiments thereof, it is not intended to be limited to the particular forms shown and described. Accordingly, the appended claims are intended to cover all modifications within the spirit and scope of the invention.

What we claim as new and desire to secure by Letters Patent of the United States is:

1. A charging system comprising:
   a. a source of charge current comprising (1) a housing, (2) a transformer having a secondary winding disposed in said housing, and (3) first, second and third source terminals, said first and third source terminals connected to said winding, said second source terminal connected to said winding at a point intermediate of the connections of said first and third source terminals to said winding;
   b. a first cellholder module comprising (1) first, second and third module terminals for selective connection to said first, second and third source terminals, respectively; (2) compartment means for holding a plurality of cells for charging; (3) circuit means connecting at least one cell in series between said first and second module terminals and between said second and third module terminals, respective; and
   c. a second module comprising (1) compartment means for holding at least one cell of a physical size different from said compartment means of said first module and (2) having only first and second module terminals for connection, respectively, to said first and third source terminals.

2. The system of claim 1 further comprising a discharge limitation means for limiting the magnitude of a discharge current flow from said module terminals.

3. The system of claim 2 wherein said discharge limitation means further functions to rectify charge current from said charger.

4. The system of claim 2 wherein said discharge limitation means is a diode connected in circuit with said circuit means.

5. The system of claim 1 wherein said compartment means is for holding a plurality of cells of the same physical size and electrical characteristics.

6. The system of claim 1 wherein said first module circuit means is for connecting a first pair of cells in series with said first and second module terminals and is for connecting a second pair of cells in series with said second and third module terminals.

7. The system of claim 6 wherein said current source supplies charge current in a first direction between said first and second terminals of said first module in a second direction, opposite to said first direction, between said third and second terminals of said first module; and wherein the polarities of said first pair of cells arranged in circuit opposite to the polarities of said second pair of cells thereby to prevent high rate discharge by short circuiting across a cell of said first pair and a cell of said second pair.

8. The system of claim 7 wherein said first module further comprises discharge limitation means for limiting a discharge current flow through the respective terminals of each said module.

9. The system of claim 8 wherein said discharge limitation means additionally functions for full wave rectification of the charge current from said source.

10. The system of claim 9 wherein said compartment means accommodate said first pair of cells in a side by side relationship with the polarities thereof physically aligned in opposite direction and accommodates said second pair of cells in side by side relationship with the polarities thereof physically aligned in opposite directions, said first and second pairs in a back to back relationship, said discharge limitation means comprise a first diode connected in circuit between said first pair of cells and a second diode connected in circuit between said second pair of cells.

11. The system of claim 1 wherein said compartment means of said first and second modules comprising (1) a plurality of compartments, each compartment having walls defining a longitudinal opening for allowing the insertion of a cell therethrough, and (2) loading tab means adjacent one end of said opening, restricting the width of said opening to a dimension less than the diameter of the cell type intended to be accommodated in said compartment.

12. A charging system comprising:
a. a source of charge current comprising (1) a housing, (2) a transformer having a secondary winding disposed in said housing, and (3) first, second and third source terminal, said first and third source terminals connected to said winding, said second source terminal connected to said winding at a point intermediate of the connections of said first and third source terminals to said winding;
b. a first cellholder module comprising (1) first, second and third module terminals for selective connection to said first, second and third source terminals, respectively; (2) compartment means for holding a first pair of cells in a side by side relationship with the polarities thereof physically aligned in opposite directions and a second pair of cells in side by side relationship with the polarities thereof physically aligned in opposite directions, said first and second pairs in a back to back relationship; and (3) circuit means connecting said first pair of cells in series with said first and second module terminals and a second pair of cells in series with said second and third module terminals, the polarities of said first pair of cells arranged in circuit opposite to the polarities of said second pair of cells thereby to prevent high rate discharge by short circuiting across a cell of said first pair and a cell of said second pair, said circuit means comprising a first diode connected in circuit between said first pair of cells and a second diode connected in circuit between said second pair of cells.

* * * * *